US012764646B2

(12) United States Patent
Zhang et al.

(10) Patent No.: US 12,764,646 B2
(45) Date of Patent: Oct. 13, 2026

(54) NETWORK SELECTION METHOD, INFORMATION SENDING METHOD, INFORMATION OBTAINING METHOD, AND APPARATUS

(71) Applicant: VIVO MOBILE COMMUNICATION CO., LTD., Guangdong (CN)

(72) Inventors: Pengfei Zhang, Guangdong (CN); Yanchao Kang, Guangdong (CN); Lufeng Han, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 736 days.

(21) Appl. No.: 18/110,694

(22) Filed: Feb. 16, 2023

(65) Prior Publication Data

US 2023/0199633 A1 Jun. 22, 2023

Related U.S. Application Data

(63) Continuation of application No. PCT/CN2021/121833, filed on Sep. 29, 2021.

(30) Foreign Application Priority Data

Sep. 30, 2020 (CN) ......................... 202011063700.7

(51) Int. Cl.
*H04W 48/18* (2009.01)
*H04W 48/16* (2009.01)
(Continued)

(52) U.S. Cl.
CPC ........... *H04W 48/18* (2013.01); *H04W 48/16* (2013.01); *H04W 48/20* (2013.01); *H04W 76/50* (2018.02); *H04W 60/04* (2013.01); *H04W 84/042* (2013.01)

(58) Field of Classification Search
CPC ..... H04W 76/50; H04W 48/16; H04W 48/20; H04W 60/04; H04W 84/042
(Continued)

(56) References Cited

U.S. PATENT DOCUMENTS

2012/0243467 A1 9/2012 Vallurupalli et al.
2014/0355417 A1 12/2014 Kim et al.
(Continued)

FOREIGN PATENT DOCUMENTS

CN 102625418 A 8/2012
CN 104081826 A 10/2014
(Continued)

OTHER PUBLICATIONS

First Office Action for Japanese Application No. 2023-519389, dated Feb. 28, 2024, 6 Pages.
(Continued)

*Primary Examiner* — Chuck Huynh
(74) *Attorney, Agent, or Firm* — BROOKS KUSHMAN P.C.

(57) ABSTRACT

A network selection method, an information sending method, an information obtaining method, and an apparatus. The network selection method includes: receiving disaster condition information related to a first PLMN to which a terminal belongs; and selecting an available PLMN for access in a case that the disaster condition information indicates a disaster condition having occurred on the first PLMN.

17 Claims, 8 Drawing Sheets

(51) Int. Cl.
*H04W 48/20* (2009.01)
*H04W 76/50* (2018.01)
*H04W 60/04* (2009.01)
*H04W 84/04* (2009.01)

(58) Field of Classification Search
USPC .......................................................... 455/435.1
See application file for complete search history.

(56) References Cited

U.S. PATENT DOCUMENTS

| | | | |
|---|---|---|---|
| 2015/0055447 | A1 | 2/2015 | Jamadagni et al. |
| 2019/0116520 | A1 | 4/2019 | Chaponniere et al. |
| 2019/0313238 | A1 | 10/2019 | Palanigounder et al. |
| 2020/0137675 | A1 | 4/2020 | Park et al. |
| 2021/0076444 | A1 | 3/2021 | Shu et al. |
| 2022/0070815 | A1 | 3/2022 | Chun |
| 2022/0086743 | A1 | 3/2022 | Chun |

FOREIGN PATENT DOCUMENTS

| | | | | |
|---|---|---|---|---|
| CN | 110831109 A | 2/2020 | | |
| JP | 2015122781 A | 7/2015 | | |
| WO | 2018231029 A1 | 12/2018 | | |
| WO | 2019196535 A1 | 10/2019 | | |
| WO | 2019223660 A1 | 11/2019 | | |
| WO | 2020102831 A1 | 5/2020 | | |
| WO | 2020141956 A1 | 7/2020 | | |
| WO | WO-2020141964 A1 * | 7/2020 | ............ | H04W 48/18 |

OTHER PUBLICATIONS

3GPP Organizational Partners “3rd Generation Partnership Project; Technical Specification Group Services and System Aspects; Study on Support for Minimization of Service Interruption (Release 17)” 3GPP TR 22.831 V0.2.1 (Sep. 2019), 2019, 19 Pages.

Editor (LGE) “TR 22.831 v.0.2.1 on Study on Support for Minimization of service Interruption (Fs_Mint)” 3GPP TSG SA Meeting #85, Newport Beach, USA, Sep. 2019, SP-190832, 1 Pages.

First Office Action for Chinese Application No. 202011063700.7, dated Dec. 5, 2022, 14 Pages.

International Search Report and Written Opinion for Application No. PCT/CN2021/121833, dated Dec. 30, 2021, 8 Pages.

3rd Generation Partnership Project; Technical Specification Group Services and System Aspects; Study on Support for Minimization of Service Interruption (Release 17), 3GPP TR 22.831 V0.1.0, May 2019, S1-191251 CL, 21 Pages.

3rd Generation Partnership Project; Technical Specification Group Services and System Aspects; Study on Support for Minimization of Service Interruption (Release 17), 3GPP TR 22.831 V0.1.0, May 2019, S1-191251 RM, 21 Pages.

Samsung “FS_MINT 22831 P-CR: Disaster Begins and Ends Use Cases” 3GPP TSG-SA WG1 Meeting #86, Suzhou, China, May 2019, S1-191423, 3 Pages.

Extended European Search Report for Application No. 21874558.6, dated Nov. 20, 2023, 11 Pages.

3GPP “3rd Generation Partnership Project; Technical Specification Group Services and System Aspects; Study on Support for Minimization of Service Interruption (Release 17)” 3GPP TR 22.831 V0.1.0, May 2019, 21 Pages.

LG Electronics, Samsung, LG Uplus, KT Corp, SK Telecom, Huawei “FS_MINT Consolidation of Requirements” 3GPP TSG-SA WG Meetin #87, Sophia Antipolis, France, Aug. 2019, S1-192844, 7 Pages.

Second Japanese Office Action for Japanese Patent Application No. 2024-158611 mailed Dec. 9, 2025. 8 pages.

* cited by examiner

NETWORK SELECTION METHOD, INFORMATION SENDING METHOD, INFORMATION OBTAINING METHOD, AND APPARATUS

CROSS-REFERENCE TO RELATED APPLICATIONS

This application is a continuation of International Application No. PCT/CN2021/121833 filed on Sep. 29, 2021, which claims priority to Chinese Patent Application No. 202011063700.7, filed on Sep. 30, 2020, which are incorporated herein by reference in their entireties.

TECHNICAL FIELD

This application pertains to the field of wireless communications technologies, and specifically relates to a network selection method, an information sending method, an information obtaining method, and an apparatus.

BACKGROUND

In a case that a network is unavailable due to failure of devices, disaster, or other causes, according to a current scheme, terminals (UE) cannot access a network to obtain services if there is no available PLMN except for a "forbidden public land mobile network (PLMN)".

SUMMARY

According to a first aspect, a network selection method is provided, applied to a terminal and including:

- receiving disaster condition information related to a first PLMN to which the terminal belongs; and
- selecting an available PLMN for access in a case that the disaster condition information indicates a disaster condition having occurred on the first PLMN.

According to a second aspect, an information sending method is provided, applied to a network-side device and including:

- sending disaster condition information related to a first PLMN.

According to a third aspect, an information obtaining method is provided, applied to a terminal and including:

- obtaining or updating disaster condition network selection information, where the disaster condition network selection information includes a PLMN list, and a PLMN in the PLMN list is a PLMN that the terminal is allowed to access in a case that a disaster condition occurs on a first PLMN to which the terminal belongs.

According to a fourth aspect, an information sending method is provided, applied to a network-side device and including:

- sending disaster condition network selection information to a terminal, where the disaster condition network selection information includes a PLMN list, and a PLMN in the PLMN list is a PLMN that the terminal is allowed to access in a case that a disaster condition occurs on a first PLMN to which the terminal belongs.

According to a fifth aspect, a network selection apparatus is provided, including:

- a receiving module, configured to receive disaster condition information related to a first PLMN to which a terminal belongs; and
- a selection module, configured to select an available PLMN for access in a case that the disaster condition information indicates a disaster condition having occurred on the first PLMN.

According to a sixth aspect, an information sending apparatus is provided, including:

- a sending module, configured to send disaster condition information related to a first PLMN.

According to a seventh aspect, an information obtaining apparatus is provided, including:

- an obtaining module, configured to obtain or update disaster condition network selection information, where the disaster condition network selection information includes a PLMN list, and PLMNs in the PLMN list are PLMNs that a terminal is allowed to access in a case that a disaster condition occurs on a first PLMN to which the terminal belongs.

According to an eighth aspect, an information sending apparatus is provided, including:

- a sending module, configured to send disaster condition network selection information to a terminal, where the disaster condition network selection information includes a PLMN list, and a PLMN in the PLMN list is a PLMN that the terminal is allowed to access in a case that a disaster condition occurs on a first PLMN to which the terminal belongs.

According to a ninth aspect, a terminal is provided, including a processor, a memory, and a program or instructions stored in the memory and capable of running on the processor, where when the program or the instructions are executed by the processor, the steps of the network selection method according to the first aspect are implemented; or when the program or the instructions are executed by the processor, the steps of the information obtaining method according to the third aspect are implemented.

According to a tenth aspect, a network-side device is provided, including a processor, a memory, and a program or instructions stored in the memory and capable of running on the processor; where when the program or the instructions are executed by the processor, the steps of the information sending method according to the second aspect are implemented; or when the program or the instructions are executed by the processor, the steps of the information sending method according to the fourth aspect are implemented.

According to an eleventh aspect, a readable storage medium is provided, where a program or instructions are stored in the readable storage medium; and when the program or the instructions are executed by a processor, the steps of the method according to the first aspect are implemented, the steps of the method according to the second aspect are implemented, the steps of the method according to the third aspect are implemented, or the steps of the method according to the fourth aspect are implemented.

According to a twelfth aspect, a chip is provided, where the chip includes a processor and a communications interface, the communications interface is coupled to the processor, and the processor is configured to run a program or instructions of a network-side device to implement the method according to the first aspect, the method according to the second aspect, the method according to the third aspect, or the method according to the fourth aspect.

According to a thirteenth aspect, a program product is provided, where the program product is stored in a non-volatile storage medium, the program product is executed by at least one processor to implement the method according to the first aspect, the method according to the second aspect, the method according to the third aspect, or the method according to the fourth aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
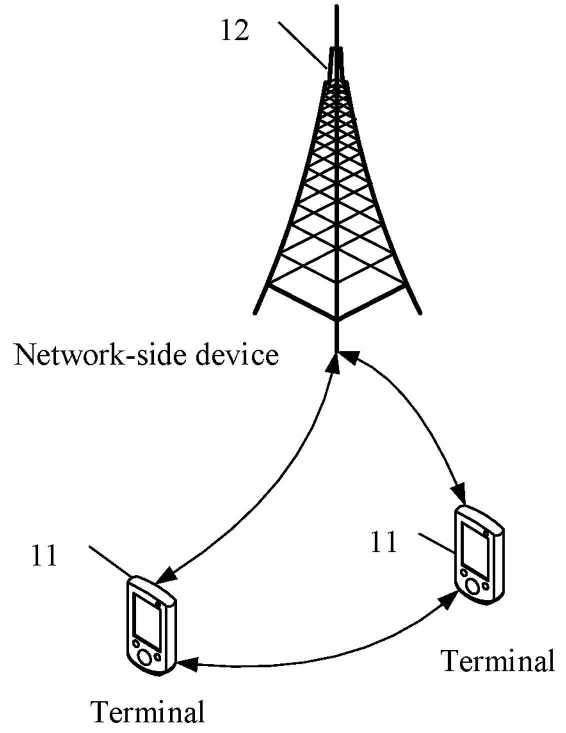
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a network selection method, an information sending method, an information obtaining method, and an apparatus provided in the embodiments of this application by using specific embodiments and application scenarios thereof with reference to the accompanying drawings.

Figure 2:
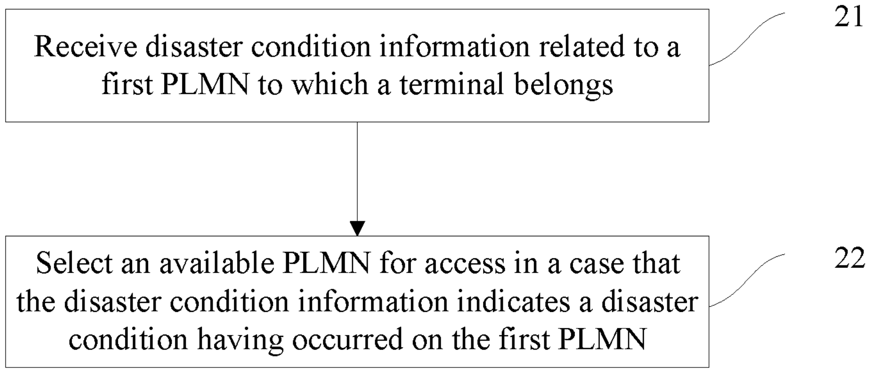
FIG. 2 is a schematic flowchart of a network selection method according to an embodiment of this application.

Referring to FIG. 2, FIG. 2 is a schematic flowchart of a network selection method according to an embodiment of this application. The method is applied to a terminal and includes the following steps.

Step 21: Receive disaster condition (DC) information related to a first PLMN to which the terminal belongs.

Step 22: Select an available PLMN for access in a case that the disaster condition information indicates a disaster condition having occurred on the first PLMN.

In this embodiment of this application, in a case that a disaster condition occurs on the PLMN to which the terminal belongs due to failure of devices or a disaster, if another network operator can provide services, the terminal may select an available PLMN for access to obtain services, with no need to consider a "forbidden PLMN" list.

In this embodiment of this application, the selecting an available PLMN for access includes one of the following:

(1) Randomly selecting one PLMN for access from all currently available PLMNs.

Any available PLMN found can be accessed, with no need to consider a "forbidden PLMN" list, so as to resolve the problem that in a case that a disaster condition occurs on a PLMN to which a terminal belongs, the terminal cannot access a network to obtain services if there is no available PLMN except for the "forbidden PLMN".

(2) Randomly selecting one PLMN for access from third PLMNs, where the third PLMN is a PLMN sending the disaster condition information and capable of providing services for users of the first PLMN in a case that a disaster condition occurs on the first PLMN.

(3) Selecting one available PLMN for access from a PLMN list in configured disaster condition network selection information, where a PLMN in the PLMN list is a PLMN that the terminal is allowed to access in a case that a disaster condition occurs on the first PLMN.

The PLMN in the PLMN list may be a "forbidden PLMN", so as to resolve the problem that in a case that a disaster condition occurs on the PLMN to which the terminal belongs, the terminal cannot access the network to obtain services if there is no available PLMN except for the "forbidden PLMN".

(4) Selecting one available PLMN for access from the PLMN list in the configured disaster condition network selection information, where the selected PLMN is the third PLMN.

That is, the selected PLMN needs to be a PLMN in the PLMN list in the disaster condition network selection information. In addition, the selected PLMN needs to a PLMN sending the disaster condition information and capable of providing services for users of the first PLMN in the case that the disaster condition occurs on the first PLMN, that is, both (2) and (3) are satisfied.

In all the foregoing four options, the "forbidden PLMN" does not need to be considered, so as to resolve the problem that in a case that a disaster condition occurs on the PLMN to which the terminal belongs, the terminal cannot access the network to obtain services if there is no available PLMN except for the "forbidden PLMN".

In the foregoing embodiment, optionally, in (3) and (4):

the selecting one available PLMN for access from a PLMN list in configured disaster condition network selection information includes one of the following:

selecting one available PLMN in descending order of priorities in a case that priority information is configured for the PLMNs in the disaster condition network selection information; and randomly selecting one available PLMN from the PLMNs in the disaster condition network selection information.

The following describes the disaster condition network selection information.

In this embodiment of this application, the disaster condition network selection information may be configured in a universal subscriber identity module (USIM) or a subscriber identity module (SIM) of the terminal.

A file name of the disaster condition network selection information may be FILE_DC_PLMN, and the file includes a PLMN list. The PLMN in the PLMN list is one or more PLMNs that the terminal is allowed to access in a case that a disaster condition occurs on the first PLMN. The PLMN list may include one or more PLMNs.

In this embodiment of this application, optionally, in addition to the PLMN list, the disaster condition network selection information also includes at least one of the following:

priority information of the PLMNs in the PLMN list; and access technologies of the PLMNs in the PLMN list.

The access technology is, for example, 2G, 3G, 4G, or 5G.

For example, in some embodiments, the PLMN list may be shown in Table 1, including priority information and access technologies.

TABLE 1

| Description |
|---|
| $1^{st}$ PLMN (highest priority) |
| $1^{st}$ PLMN Access Technology-Identifier |
| $2^{nd}$ PLMN |
| $2^{nd}$ PLMN Access Technology Identifier |
| : |

In Table 1, $1^{st}$ PLMN has the highest priority, and the access technology is denoted by an access technology identifier.

For example, in some embodiments, the PLMN list may alternatively be shown in Table 2, excluding priority information.

TABLE 2

| Description |
|---|
| $1^{st}$ PLMN |
| $1^{st}$ PLMN Access Technology Identifier |
| $2^{nd}$ PLMN |
| $2^{nd}$ PLMN Access Technology Identifier |
| : |

In this embodiment of this application, optionally, the network selection method further includes: obtaining or updating the disaster condition network selection information.

In this embodiment of this application, obtaining generally refers to initially obtaining, and updating refers to updating the original one.

The following describes several manners of obtaining or updating the disaster condition network selection information.

In this embodiment of this application, the terminal may obtain or update the disaster condition network selection information during a registration procedure and/or after the registration procedure is completed.

Embodiment 1

In this embodiment of this application, the obtaining or updating the disaster condition network selection information includes: receiving encrypted disaster condition network selection information sent by a first home PLMN.

In this embodiment of this application, during a registration procedure and/or after the registration procedure is completed, the terminal may receive the encrypted disaster condition network selection information sent by the first home PLMN.

The encryption manner can improve security of transmission of the disaster selection network information.

In some other embodiments of this application, the disaster condition network selection information may alternatively be sent in plain text without encryption, which is described by using an example below.

Embodiment 2

In this embodiment of this application, that the terminal may obtain or update the disaster condition network selection information during the registration procedure includes:

sending a registration request to a network-side device of a first home PLMN or a first visited PLMN; and receiving registration accept information sent by the network-side device, where the registration accept information carries the disaster condition network selection information.

The following describes a manner of obtaining or updating the disaster condition network selection information by the terminal through an interaction procedure between the terminal and the network-side device.

Figure 3:
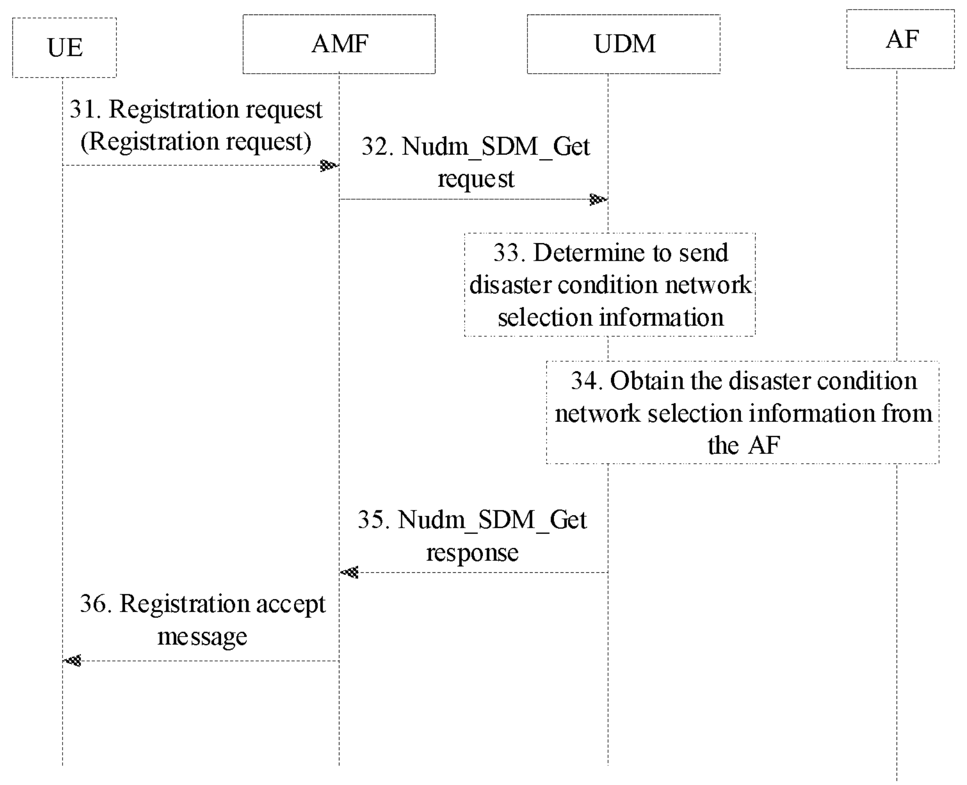
FIG. 3 is a schematic flowchart of a method for obtaining or updating disaster condition network selection information by a terminal according to an embodiment of this application.

Referring to FIG. 3, the method for obtaining or updating the disaster condition network selection information by the terminal during the registration procedure includes the following steps.

Step 31: The terminal (UE) sends a registration request to an access and mobility management function (AMF).

The AMF may be a home AMF of the terminal, or may be a visited AMF.

Step 32: After receiving the registration request, the AMF sends a Nudm_SDM_Get request (request) to a unified data management entity (Unified Data Management, UDM), where the request is used to request slice selection subscription data of the terminal.

Step 33: After receiving the Nudm_SDM_Get request sent by the AMF, if determining (which may be performed based on an operator policy, a registration type, change of the disaster condition network selection information, and/or the like) to send the disaster condition network selection information to the UE, the UDM adds the disaster condition network selection information to a Nudm_SDM_Get response (response).

Step 34: The disaster condition network selection information may alternatively be stored in an application function (AF), and then the UDM needs to first obtain the disaster condition network selection information from the AF and adds the disaster condition network selection information to a Nudm_SDM_Get response.

Step 35: The UDM sends the network selection information carrying the disaster to the AMF by using the Nudm_SDM_Get response message.

Step 36: The AMF adds DC information to a registration accept message, and sends the message to the terminal.

Content contained in the registration accept message may be shown in Table 3, and includes the disaster condition network selection information.

TABLE 3

Content of the registration accept message

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| 4A | Equivalent PLMNs | PLMN list 9.11.3.45 | O | TLV | 5-47 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |

TABLE 3-continued

Content of the registration accept message

| IEI | Information Element | Type/Reference | Presence | Format | Length |
|---|---|---|---|---|---|
| 79 | LADN information | LADN information 9.11.3.30 | O | TLV-E | 12-1715 |
| B- | MICO indication | MICO indication 9.11.3.31 | O | TV | 1 |
| 9- | Network slicing indication | Network slicing indication 9.11.3.36 | O | TV | 1 |
| 27 | Service area list | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |
| 7A | Extended emergency number list | Extended emergency number list 9.11.3.26 | O | TLV-E | 7-65538 |
| 73 | SOR transparent container | SOR transparent container 9.11.3.51 | O | TLV-E | 20-n |
| 78 | EAP message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-n |
| 51 | Negotiated DRX parameters | 5GS DRX parameters 9.11.3.2A | O | TLV | 3 |
| D- | Non-3GPP NW policies | Non-3GPP NW provided policies 9.11.3.36A | O | TV | 1 |
| 60 | EPS bearer context status | EPS bearer context status 9.11.3.23A | O | TLV | 4 |
| 6E | Negotiated extended DRX parameters | Extended DRX parameters 9.11.3.26A | O | TLV | 3 |
| 6C | T3447 value | GPRS timer 3 9.11.2.5 | O | TLV | 3 |
| 6B | T3448 value | GPRS timer 3 9.11.2.4 | O | TLV | 3 |
| 6A | T3324 value | GPRS timer 3 9.11.2.5 | O | TLV | 3 |
| 67 | UE radio capability ID | UE radio capability ID 9.11.3.68 | O | TLV | 3-n |
| 68 | UE radio capability ID deletion indication | UE radio capability ID deletion indication 9.11.3.69 | O | TV | 1 |
| 39 | Pending NSSAI | NSSAI 9.11.3.37 | O | TLV | 4-146 |
| 74 | Ciphering key data | Ciphering key data 9.11.3.18C | O | TLV-E | 34-n |
| 75 | CAG information list | CAG information list 9.11.3.18A | O | TLV-E | 3-n |
| 1B | Truncated 5G-S-TMSI configuration | Truncated 5G-S-TMSI configuration 9.11.3.70 | O | TLV | 3 |
| 1C | Negotiated WUS assistance information | WUS assistance information 9.11.3.71 | O | TLV | 3-n |
| 29 | Negotiated NB-N1 mode DRX parameters | NB-N1 mode DRX parameters 9.11.3.73 | O | TLV | 3 |
| XX | Disaster condition network selection information | | | | |

Embodiment 3

In this embodiment of this application, the terminal obtains or updates the disaster condition network selection information after registration is completed, and the obtaining or updating the disaster condition network selection information includes: receiving downlink non-access stratum transport information sent by a network-side device of a first home PLMN or a first visited PLMN, where the downlink non-access stratum transport information carries the disaster condition network selection information.

The following describes a manner of obtaining or updating the disaster condition network selection information by the terminal through an interaction procedure between the terminal and the network-side device.

Figure 4:
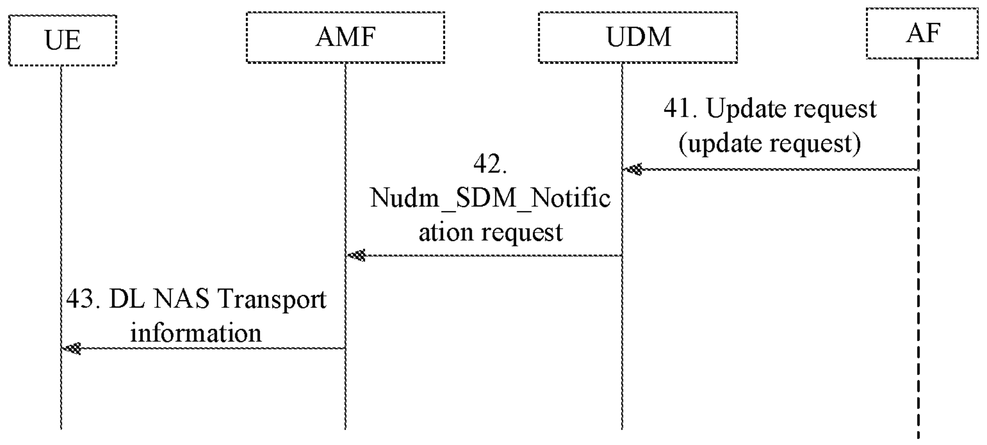
FIG. 4 is a schematic flowchart of a method for obtaining or updating disaster condition network selection information by a terminal according to another embodiment of this application.

Referring to FIG. 4, the method for obtaining or updating the disaster condition network selection information by the terminal during the registration procedure includes the following steps.

Step 41: An AF may trigger an update request for the disaster condition network selection information.

Step 42: A UDM sends updated disaster condition network selection information to an AMF by using a Nudm_SDM_Notification request.

This process may be used for registration of the terminal on a home network or a visited network. Correspondingly, for registration on the home network, it corresponds to a home AMF; and for registration on the visited network, it corresponds to a visited AMF.

Step 43: The AMF sends the updated disaster condition network selection information to the terminal by using a DL NAS TRANSPORT (downlink non-access stratum transport information).

Content contained in the DL NAS TRANSPORT (downlink non-access stratum transport information) may be shown in Table 4, including the disaster condition network selection information.

TABLE 4

Content of the DL NAS TRANSPORT message

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | DL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 24 | Additional information | Additional information 9.11.2.1 | O | TLV | 3-n |
| 58 | 5GMM cause | 5GMM cause 9.11.3.2 | O | TV | 2 |
| 37 | Back-off timer value | GPRS timer 3 9.11.2.5 | O | TLV | 3 |
| XX | Disaster condition network selection information | | | | |

Embodiment 4

In this embodiment of this application, the terminal obtains or updates the disaster condition network selection information after registration is completed, and the obtaining or updating the disaster condition network selection information includes: receiving a configuration update command sent by a network-side device of a first home PLMN or a first visited PLMN, where the configuration update command carries the disaster condition network selection information.

The following describes a manner of obtaining or updating the disaster condition network selection information by the terminal through an interaction procedure between the terminal and the network-side device.

Figure 5:
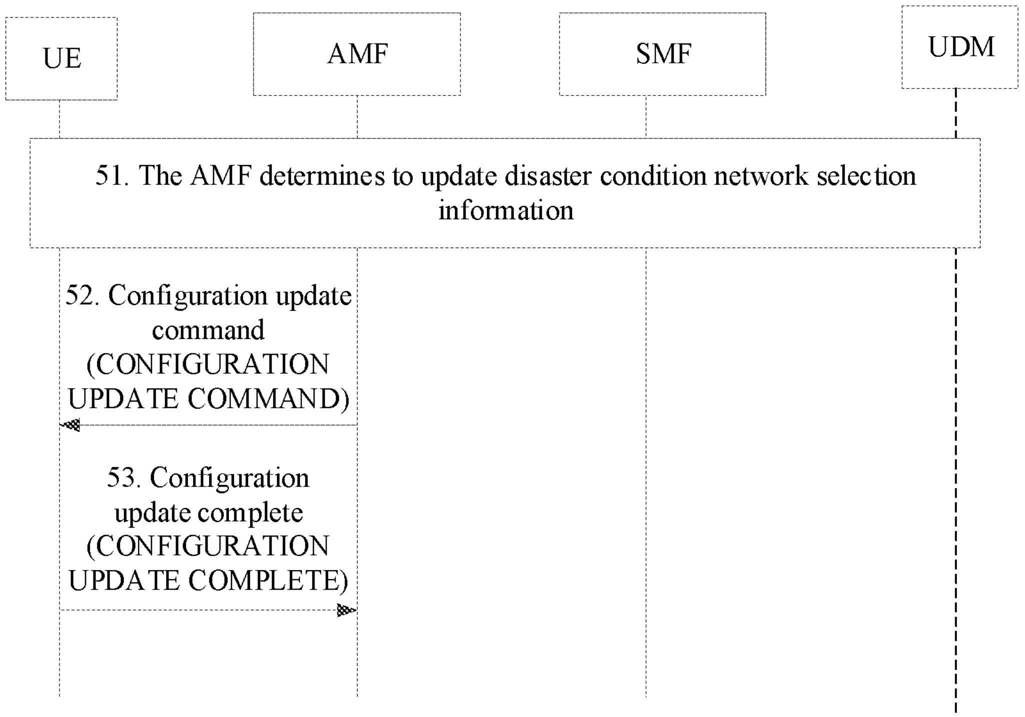
FIG. 5 is a schematic flowchart of a method for obtaining or updating disaster condition network selection information by a terminal according to still another embodiment of this application.

Referring to FIG. 5, the method for obtaining or updating the disaster condition network selection information by the terminal during the registration procedure includes the following steps.

Step 51: An AMF determines to update the disaster condition network selection information, where a triggering condition may be at least one of the following conditions: change of UE mobility, network policy, receiving by the AMF a subscription data update notification sent by an UDM, change of network slice configuration, change of enhanced coverage restriction information in UE context, and the like.

Step 52: The AMF sends a configuration update command message to the terminal, where the message includes the disaster condition network selection information.

Optionally, message content of the configuration update command is shown in Table 5.

TABLE 5

Message content of the configuration update command

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Configuration update command message identity | Message type 9.7 | M | V | 1 |
| D- | Configuration update indication | Configuration update indication 9.11.3.18 | O | TV | 1 |
| 77 | 5G-GUTI | 5GS mobile identity 9.11.3.4 | O | TLV-E | 14 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 27 | Service area list | Service area list 9.11.3.49 | O | TLV | 6-114 |
| 43 | Full name for network | Network name 9.11.3.35 | O | TLV | 3-n |
| 45 | Short name for network | Network name 9.11.3.35 | O | TLV | 3-n |
| 46 | Local time zone | Time zone 9.11.3.52 | O | TV | 2 |
| 47 | Universal time and local time zone | Time zone and time 9.11.3.53 | O | TV | 8 |
| 49 | Network daylight saving time | Daylight saving time 9.11.3.19 | O | TLV | 3 |
| 79 | LADN information | LADN information 9.11.3.30 | O | TLV-E | 3-1715 |
| B- | MICO indication | MICO indication 9.11.3.31 | O | TV | 1 |
| 9- | Network slicing indication | Network slicing indication 9.11.3.36 | O | TV | 1 |
| 31 | Configured NSSAI | NSSAI 9.11.3.37 | O | TLV | 4-146 |
| 11 | Rejected NSSAI | Rejected NSSAI 9.11.3.46 | O | TLV | 4-42 |
| 76 | Operator-defined access category definitions | Operator-defined access category definitions 9.11.3.38 | O | TLV-E | 3-n |
| F- | SMS indication | SMS indication 9.11.3.50A | O | TV | 1 |
| 6C | T3447 value | GPRS timer 3 9.11.2.5 | O | TLV | 3 |
| 75 | CAG information list | CAG information list 9.11.3.18A | O | TLV-E | 3-n |
| 67 | UE radio capability ID | UE radio capability ID 9.11.3.68 | O | TLV | 3-n |
| A- | UE radio capability ID deletion indication | UE radio capability ID deletion indication 9.11.3.69 | O | TV | 1 |
| 44 | 5GS registration result | 5GS registration result 9.11.3.6 | O | TLV | 3 |
| 1B | Truncated 5G-S-TMSI configuration | Truncated 5G-S-TMSI configuration 9.11.3.70 | O | TLV | 3 |
| C- | Additional configuration indication | Additional configuration indication 9.11.3.74 | O | TV | 1 |
| XX | DC network selection information | | | | |

Step 53 (optional): If the configuration update command requires the UE to send an ack message to the AMF after the update is completed, the UE needs to send a configuration update complete message.

The following describes in detail a manner of receiving disaster condition information.

In this embodiment of this application, optionally, the receiving disaster condition information related to a first PLMN to which the terminal belongs includes one of the following:

(1) Receiving disaster condition information broadcast by a second PLMN.

The disaster condition information broadcast by the second PLMN includes at least one of the following:

a disaster condition having occurred on the first PLMN;

area information of a disaster condition having occurred on the first PLMN, where the area information may be, for example, a tracking area (TA) list and/or address location; and indication information for indicating whether the second PLMN is able to provide services for users of the first PLMN in a case that a disaster condition occurs on the first PLMN.

That is, the following cases exist:

A. The second PLMN merely broadcasts the disaster condition having occurred on the first PLMN, but is not responsible for providing services to the users of the first PLMN.

B. The second PLMN broadcasts the disaster condition having occurred on the first PLMN, and is responsible for providing services to the users of the first PLMN.

C. The second PLMN can be responsible for providing services to the users of the first PLMN in the case that the disaster condition occurs on the first PLMN, but is not responsible for broadcasting the disaster condition having occurred on the first PLMN.

In case C, regardless of whether the disaster condition occurs on the first PLMN, the second PLMN may broadcast disaster indication information.

In the foregoing three cases, the second PLMN may broadcast disaster condition information when one of the following conditions is satisfied:

a disaster condition having occurred on the first PLMN;

a government indication being received; and an operator indication being received.

(2) Receiving disaster condition information sent by the first PLMN.

In this case, it is possible that an access network device of the first PLMN is normal but other devices are faulty, and then a base station of the first PLMN may send the disaster condition information to the terminal.

Optionally, the receiving the disaster condition information sent by the first PLMN includes at least one of the following:

receiving the disaster condition information provided by the first PLMN by using a broadcast message;

receiving the disaster condition information provided by the first PLMN by using a non-access stratum (NAS) message;

receiving the disaster condition information provided by the first PLMN by using an RRC release message; and receiving the disaster condition information provided by the first PLMN by using a switching command.

The disaster condition information sent by the first PLMN includes at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

In this embodiment of this application, optionally, the selecting an available PLMN for access includes one of the following: sending an access stratum (AS) message to the selected PLMN, so as to perform cell selection or reselection on the selected PLMN.

In this embodiment of this application, optionally, after the selecting an available PLMN for access, the following is further included:

searching for a PLMN based on a preset periodicity; and reselecting to a higher-priority PLMN (for example, the first PLMN) in a case that the higher-priority PLMN is found.

Optionally, the preset periodicity is configured in a SIM or USIM of the terminal, or determined during implementation by the terminal, or configured by an operator.

Figure 6:
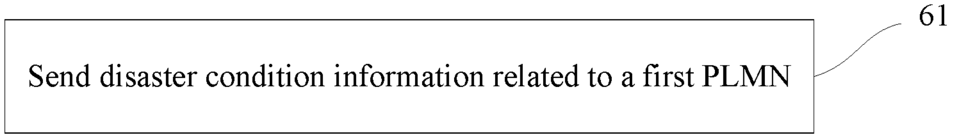
FIG. 6 is a schematic flowchart of an information sending method according to an embodiment of this application.

As shown in FIG. 6, an embodiment of this application further provides an information sending method, applied to a network-side device and including the following step.

Step 61: Send disaster condition information related to a first PLMN.

Optionally, the network-side device is a network-side device of a second PLMN or a network-side device of the first PLMN.

Optionally, the disaster condition information broadcast by the network-side device of the second PLMN includes at least one of the following:

a disaster condition having occurred on the first PLMN;

area information of a disaster condition having occurred on the first PLMN; and indication information for indicating whether the second PLMN is able to provide services for users of the first PLMN in a case that a disaster condition occurs on the first PLMN.

Optionally, the network-side device is a network-side device of the first PLMN; and the sending disaster condition information related to a first PLMN includes at least one of the following:

sending the disaster condition information by using a broadcast message;

sending the disaster condition information by using a non-access stratum message;

sending the disaster condition information by using an RRC release message; and sending the disaster condition information by using a switching command.

Optionally, the network-side device is a network-side device of the first PLMN; and the disaster condition information sent by the first PLMN includes at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

Figure 7:
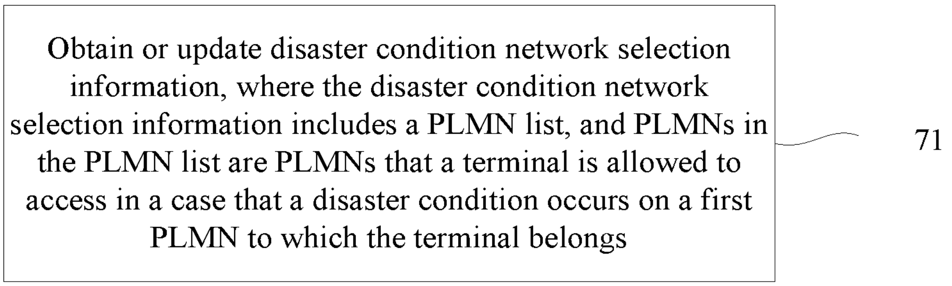
FIG. 7 is a schematic flowchart of an information obtaining method according to an embodiment of this application.

As shown in FIG. 7, an embodiment of this application further provides an information obtaining method, applied to a terminal and including the following step.

Step 71: Obtain or update disaster condition network selection information, where the disaster condition network selection information includes a PLMN list, and a PLMN in the PLMN list is a PLMN that the terminal is allowed to access in a case that a disaster condition occurs on a first PLMN to which the terminal belongs.

In this application, the terminal obtains and updates the disaster condition network selection information. In a case that a disaster condition occurs on the PLMN to which the terminal belongs due to failure of devices or a disaster, if another network operator can provide services, the terminal may select, based on a PLMN in the disaster condition network selection information, an available PLMN for access to obtain services, with no need to consider a "forbidden PLMN" list.

Optionally, the disaster condition network selection information further includes at least one of the following:

priority information of the PLMNs in the PLMN list; and
access technologies of the PLMNs in the PLMN list.

Optionally, the obtaining or updating the disaster condition network selection information includes:

receiving encrypted disaster condition network selection information sent by a first home PLMN.

Optionally, the obtaining or updating the disaster condition network selection information includes:

sending a registration request to a network-side device of a first home PLMN or a first visited PLMN; and receiving registration accept information sent by the network-side device, where the registration accept information carries the disaster condition network selection information.

Optionally, the obtaining or updating the disaster condition network selection information includes:

receiving downlink non-access stratum transport information sent by a network-side device of a first home PLMN or a first visited PLMN, where the downlink non-access stratum transport information carries the disaster condition network selection information.

Optionally, the obtaining or updating the disaster condition network selection information includes:

receiving a configuration update command sent by a network-side device of a first home PLMN or a first visited PLMN, where the configuration update command carries the disaster condition network selection information.

Figure 8:
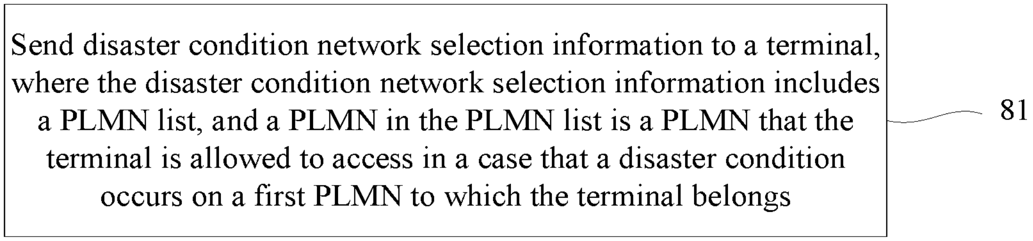
FIG. 8 is a schematic flowchart of an information sending method according to an embodiment of this application.

As shown in FIG. 8, an embodiment of this application further provides an information sending method, applied to a network-side device and including the following step.

Step 81: Send disaster condition network selection information to a terminal, where the disaster condition network selection information includes a PLMN list, and a PLMN in the PLMN list is a PLMN that the terminal is allowed to access in a case that a disaster condition occurs on a first PLMN to which the terminal belongs.

Optionally, the disaster condition network selection information further includes at least one of the following:

priority information of the PLMNs in the PLMN list; and
access technologies of the PLMNs in the PLMN list.

Optionally, the sending disaster condition network selection information to a terminal includes:

sending encrypted disaster condition network selection information to the terminal by a network-side device of a first home PLMN.

Optionally, the sending disaster condition network selection information to a terminal includes:

receiving a registration request sent by the terminal; and sending, to the terminal, registration accept information carrying the disaster condition network selection information.

Optionally, the receiving a registration request sent by the terminal includes: receiving, by an access and mobility management entity AMF, the registration request; and the sending, to the terminal, registration accept information carrying the disaster condition network selection information includes:

sending, by the AMF to a unified data management entity UDM, a first request for requesting slice selection subscription data of the terminal;

in a case that the UDM determines necessity of sending the disaster condition network selection information to the terminal, adding the disaster condition network selection information to response information for the first request to be sent to the AMF; and sending, by the AMF to the terminal, the registration accept information carrying the disaster condition network selection information.

Optionally, the sending disaster condition network selection information to a terminal includes:

sending, to the terminal, downlink non-access stratum transport information carrying the disaster condition network selection information.

Optionally, the sending, to the terminal, downlink non-access stratum transport information carrying the disaster condition network selection information includes:

sending, by an application function AF, an update request for the disaster condition network selection information to a UDM;

sending, by the UDM, updated disaster condition network selection information to an AMF based on the update request; and sending, by the AMF to the terminal, the downlink non-access stratum transport information carrying the updated disaster condition network selection information.

Optionally, the sending disaster condition network selection information to a terminal includes:

sending, to the terminal, a configuration update command carrying the disaster condition network selection information.

Optionally, the sending, to the terminal, a configuration update command carrying the disaster condition network selection information includes:

in a case that an AMF determines necessity of sending the disaster condition network selection information to the terminal, sending, to the terminal, the configuration update command carrying the disaster condition network selection information.

It should be noted that, for the network selection method provided in the embodiments of this application, the execution body may be a network selection apparatus, or a control module for executing the network selection method in the network selection apparatus. In the embodiments of this application, the network selection apparatus provided by the embodiments of this application is described by using the network selection method being executed by the network selection apparatus as an example.

Figure 9:
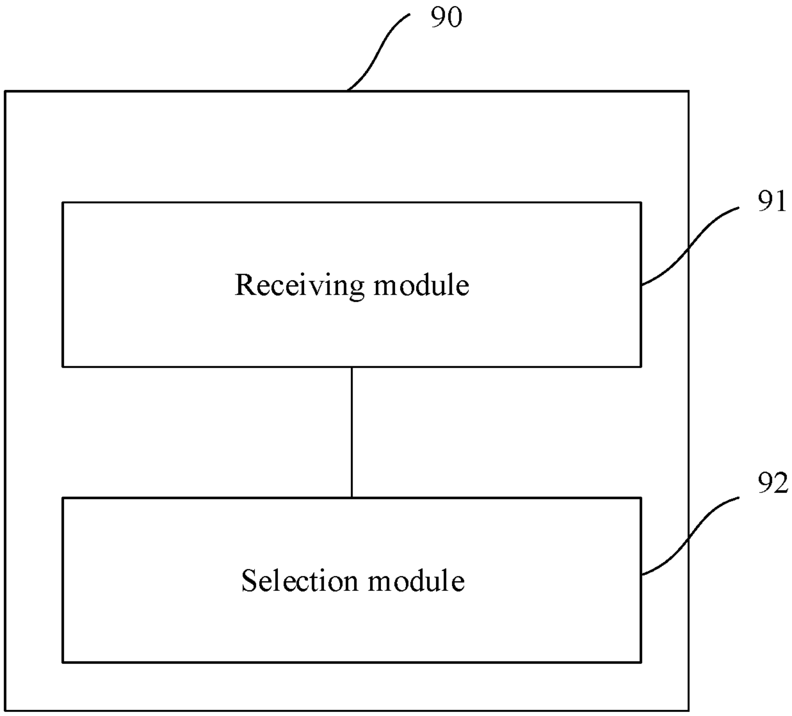
FIG. 9 is a schematic structural diagram of a network selection apparatus according to an embodiment of this application.

Referring to FIG. 9, an embodiment of this application further provides a network selection apparatus 90, including:

a receiving module 91, configured to receive disaster condition information related to a first PLMN to which a terminal belongs; and a selection module 92, configured to select an available PLMN for access in a case that the disaster condition information indicates a disaster condition having occurred on the first PLMN.

Optionally, the selecting an available PLMN for access includes one of the following:

randomly selecting one PLMN for access from all currently available PLMNs;

randomly selecting one PLMN for access from third PLMNs, where the third PLMN is a PLMN sending the disaster condition information and capable of providing services for users of the first PLMN in a case that a disaster condition occurs on the first PLMN;

selecting one available PLMN for access from a PLMN list in configured disaster condition network selection information, where a PLMN in the PLMN list is a PLMN that the terminal is allowed to access in a case that a disaster condition occurs on the first PLMN; and selecting one available PLMN for access from the PLMN list in the configured disaster condition network selection information, where the selected PLMN is the third PLMN.

Optionally, the selecting one available PLMN for access from a PLMN list in configured disaster condition network selection information includes one of the following:

selecting one available PLMN in descending order of priorities in a case that priority information is configured for the PLMNs in the disaster condition network selection information; and randomly selecting one available PLMN from the PLMNs in the disaster condition network selection information.

Optionally, the disaster condition network selection information further includes at least one of the following:

priority information of the PLMNs in the PLMN list; and access technologies of the PLMNs in the PLMN list.

Optionally, the network selection apparatus further includes:

an obtaining and updating module, configured to obtain or update the disaster condition network selection information.

Optionally, the obtaining and updating module is configured to receive encrypted disaster condition network selection information sent by a first home PLMN.

Optionally, the obtaining and updating module is configured to send a registration request to a network-side device of a first home PLMN or a first visited PLMN; and receive registration accept information sent by the network-side device, where the registration accept information carries the disaster condition network selection information.

Optionally, the obtaining and updating module is configured to receive downlink non-access stratum transport information sent by a network-side device of a first home PLMN or a first visited PLMN, where the downlink non-access stratum transport information carries the disaster condition network selection information.

Optionally, the obtaining and updating module is configured to receive a configuration update command sent by a network-side device of a first home PLMN or a first visited PLMN, where the configuration update command carries the disaster condition network selection information.

Optionally, the receiving disaster condition information related to a first PLMN to which the terminal belongs includes one of the following:

receiving the disaster condition information broadcast by a second PLMN; and receiving the disaster condition information sent by the first PLMN.

Optionally, the disaster condition information broadcast by the second PLMN includes at least one of the following:

a disaster condition having occurred on the first PLMN;

area information of a disaster condition having occurred on the first PLMN; and indication information for indicating whether the second PLMN is able to provide services for users of the first PLMN in a case that a disaster condition occurs on the first PLMN.

Optionally, the receiving the disaster condition information sent by the first PLMN includes at least one of the following:

receiving the disaster condition information provided by the first PLMN by using a broadcast message;

receiving the disaster condition information provided by the first PLMN by using a non-access stratum message;

receiving the disaster condition information provided by the first PLMN by using an RRC release message; and receiving the disaster condition information provided by the first PLMN by using a switching command.

Optionally, the disaster condition information sent by the first PLMN includes at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

Optionally, the selection module is configured to send an access stratum message to the selected PLMN, so as to perform cell selection or reselection on the selected PLMN.

Optionally, the network selection apparatus further includes:

a searching module, configured to search for a PLMN based on a preset periodicity; and a reselection module, configured to reselect to a higher-priority PLMN in a case that the higher-priority PLMN is found.

Optionally, the preset periodicity is configured in a SIM or USIM of the terminal, or determined during implementation by the terminal, or configured by an operator.

The network selection apparatus in this embodiment of this application may be an apparatus, or may be a component, an integrated circuit, or a chip in the terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The network selection apparatus in this embodiment of this application may be an apparatus having an operating system. The operating system may be an Android operating system, an iOS operating system, or other possible operating systems, and is not specifically limited in the embodiments of this application.

The network selection apparatus provided in this embodiment of this application can implement the processes implemented in the method embodiment in FIG. 2, with the same technical effects achieved. To avoid repetition, details are not described herein again.

It should be noted that, for the information sending method provided in the embodiment in FIG. 6, the execution body may be an information sending apparatus, or a control module for executing the information sending method in the information sending apparatus. In the embodiments of this application, the information sending apparatus provided by the embodiments of this application is described by using the information sending method being executed by the information sending apparatus as an example.

Figure 10:
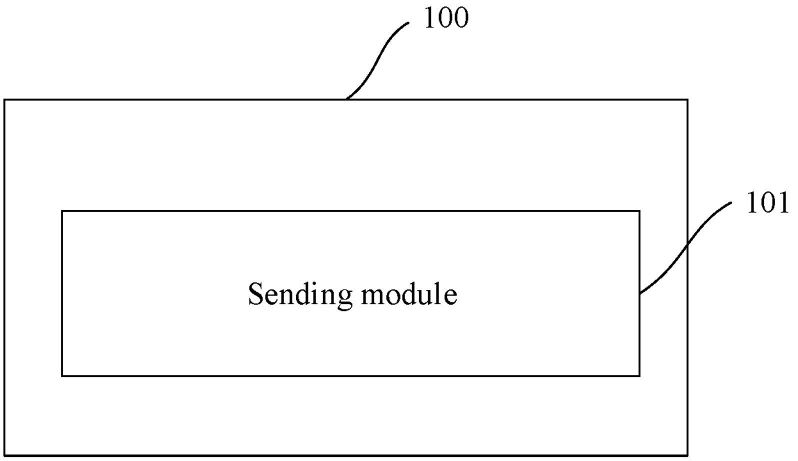
FIG. 10 is a schematic structural diagram of an information sending apparatus according to an embodiment of this application.

Referring to FIG. 10, an embodiment of this application further provides an information sending apparatus, including:

a sending module 101, configured to send disaster condition information related to a first PLMN.

Optionally, the information sending apparatus is an information sending apparatus of a second PLMN or an information sending apparatus of the first PLMN.

Optionally, the disaster condition information broadcast by the information sending apparatus of the second PLMN includes at least one of the following:

a disaster condition having occurred on the first PLMN;

area information of a disaster condition having occurred on the first PLMN; and indication information for indicating whether the second PLMN is able to provide services for users of the first PLMN in a case that a disaster condition occurs on the first PLMN.

Optionally, the information sending apparatus is an information sending apparatus of the first PLMN; and the sending module 101 is configured to perform at least one of the following:

sending the disaster condition information by using a broadcast message;

sending the disaster condition information by using a non-access stratum message;

sending the disaster condition information by using an RRC release message; and sending the disaster condition information by using a switching command.

Optionally, the information sending apparatus is an information sending apparatus of the first PLMN; and the disaster condition information sent by the first PLMN includes at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

The information sending apparatus provided in this embodiment of this application can implement the processes implemented in the method embodiment in FIG. 6, with the same technical effects achieved. To avoid repetition, details are not described herein again.

It should be noted that, for the information obtaining method provided in the embodiments of this application, the execution body may be an information obtaining apparatus, or a control module for executing the information obtaining method in the information obtaining apparatus. In the embodiments of this application, the information obtaining apparatus provided by the embodiments of this application is described by using the information obtaining method being executed by the information obtaining apparatus as an example.

Figure 11:
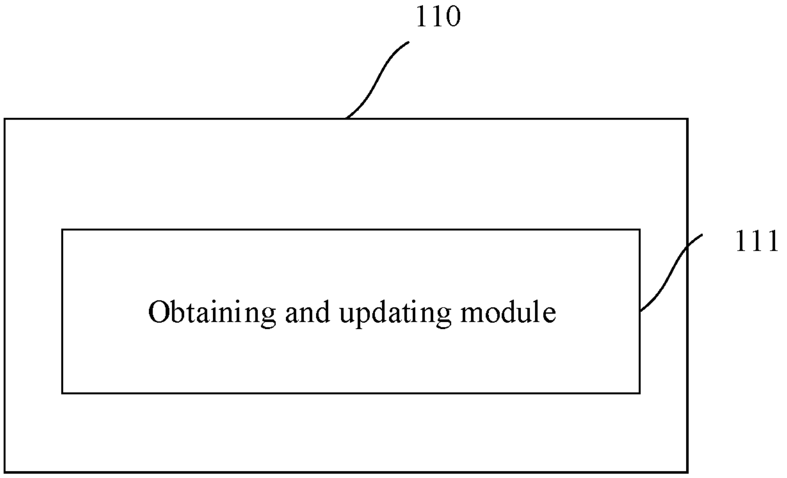
FIG. 11 is a schematic structural diagram of an information obtaining apparatus according to an embodiment of this application.

Referring to FIG. 11, an embodiment of this application further provides an information obtaining apparatus 110, including:

an obtaining and updating module 111, configured to obtain or update disaster condition network selection information, where the disaster condition network selection information includes a PLMN list, and a PLMN in the PLMN list is a PLMN that the terminal is allowed to access in a case that a disaster condition occurs on a first PLMN to which the terminal belongs.

Optionally, the disaster condition network selection information further includes at least one of the following:

priority information of the PLMNs in the PLMN list; and access technologies of the PLMNs in the PLMN list.

Optionally, the obtaining and updating module 111 is configured to receive encrypted disaster condition network selection information sent by a first home PLMN.

Optionally, the obtaining and updating module 111 is configured to send a registration request to a network-side device of a first home PLMN or a first visited PLMN; and receive registration accept information sent by the network-side device, where the registration accept information carries the disaster condition network selection information.

Optionally, the obtaining and updating module 111 is configured to receive downlink non-access stratum transport information sent by a network-side device of a first home PLMN or a first visited PLMN, where the downlink non-access stratum transport information carries the disaster condition network selection information.

Optionally, the obtaining and updating module 111 is configured to receive a configuration update command sent by a network-side device of a first home PLMN or a first visited PLMN, where the configuration update command carries the disaster condition network selection information.

The information obtaining apparatus provided in this embodiment of this application can implement the processes implemented in the method embodiment in FIG. 7, with the same technical effects achieved. To avoid repetition, details are not described herein again.

It should be noted that, for the information sending method provided in the embodiment in FIG. 8, the execution body may be an information sending apparatus, or a control module for executing the information sending method in the information sending apparatus. In the embodiments of this application, the information sending apparatus provided by the embodiments of this application is described by using the information sending method being executed by the information sending apparatus as an example.

Figure 12:
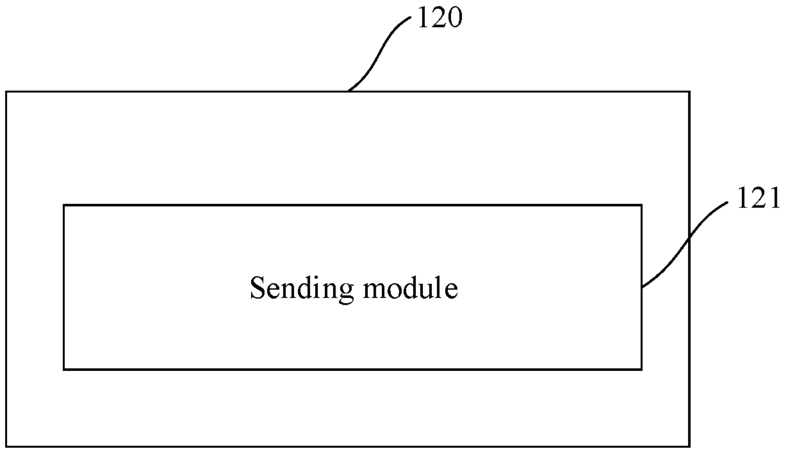
FIG. 12 is a schematic structural diagram of an information sending apparatus according to an embodiment of this application.

Referring to FIG. 12, an embodiment of this application further provides an information sending apparatus 120, including:

a sending module 121, configured to send disaster condition network selection information to a terminal, where the disaster condition network selection information includes a PLMN list, and a PLMN in the PLMN list is a PLMN that the terminal is allowed to access in a case that a disaster condition occurs on a first PLMN to which the terminal belongs.

Optionally, the disaster condition network selection information further includes at least one of the following:

priority information of the PLMNs in the PLMN list; and access technologies of the PLMNs in the PLMN list.

Optionally, the sending module 121 is configured to send encrypted disaster condition network selection information to the terminal by a network-side device of a first home PLMN.

Optionally, the information sending apparatus further includes:

a receiving module, configured to receive a registration request sent by the terminal.

The sending module 121 is configured to send, to the terminal, the registration accept information carrying the disaster condition network selection information.

Optionally, an AMF receives the registration request.

The AMF sends, to a unified data management entity UDM, a first request for requesting slice selection subscription data of the terminal;

in a case that the UDM determines necessity of sending the disaster condition network selection information to the terminal, add the disaster condition network selection information to response information for the first request to be sent to the AMF; and the AMF sends, to the terminal, the registration accept information carrying the disaster condition network selection information.

Optionally, the sending module 121 is configured to send to the terminal, downlink non-access stratum transport information carrying the disaster condition network selection information.

Optionally, an AF sends an update request for the disaster condition network selection information to a UDM;

the UDM sends updated disaster condition network selection information to an AMF based on the update request; and the AMF sends, to the terminal, the downlink non-access stratum transport information carrying the updated disaster condition network selection information.

Optionally, the sending module 121 is configured to send, to the terminal, a configuration update command carrying the disaster condition network selection information.

Optionally, in a case that an AMF determines necessity of sending the disaster condition network selection information to the terminal, sending, to the terminal, the configuration update command carrying the disaster condition network selection information.

The information sending apparatus provided in this embodiment of this application can implement the processes implemented in the method embodiment in FIG. 8, with the same technical effects achieved. To avoid repetition, details are not described herein again.

Figure 13:
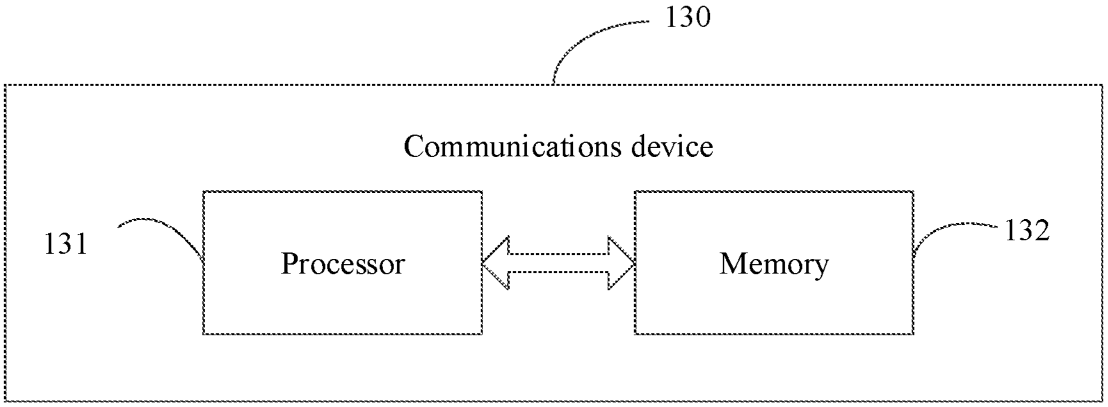
FIG. 13 is a schematic structural diagram of a communications device according to an embodiment of this application.

As shown in FIG. 13, an embodiment of this application further provides a communications device 130, including a processor 131, a memory 132, and a program or instructions stored in the memory 132 and capable of running on the processor 131. For example, when the communications device 130 is a terminal and when the program or the instructions are executed by the processor 131, the processes of the foregoing embodiment of the network selection method or the information obtaining method are implemented, with the same technical effects achieved. When the communications device 130 is a network-side device and when the program or the instructions are executed by the processor 131, the processes of the foregoing embodiment of the information sending method are implemented, with the same technical effects achieved. To avoid repetition, details are not described herein again.

Figure 14:
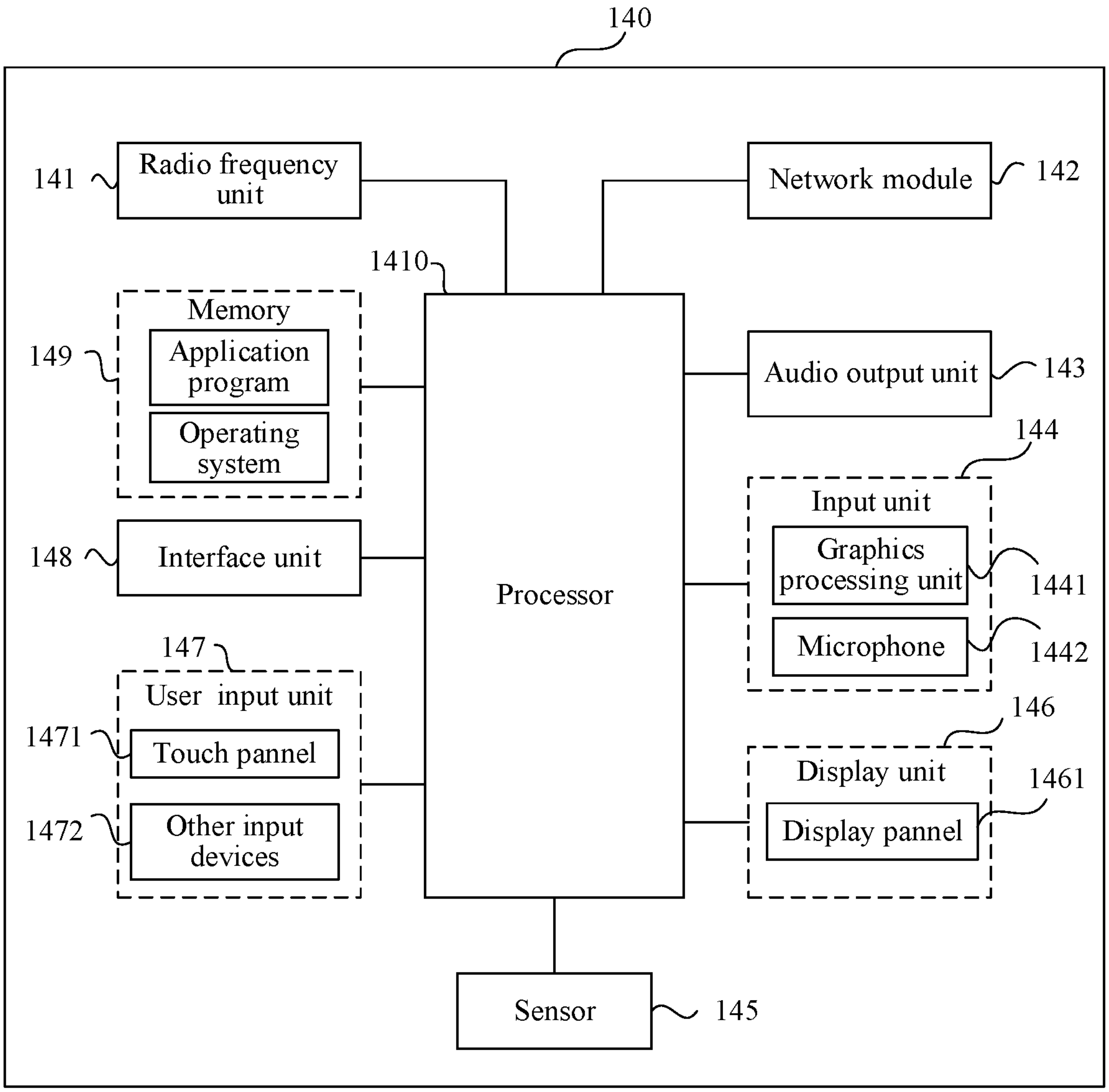
FIG. 14 is a schematic diagram of a hardware structure of a terminal according to an embodiment of this application.

FIG. 14 is a schematic diagram of a hardware structure of a terminal for implementing the embodiments of this application. The terminal 140 includes but is not limited to components such as a radio frequency unit 141, a network module 142, an audio output unit 143, an input unit 144, a sensor 145, a display unit 146, a user input unit 147, an interface unit 148, a memory 149, and a processor 1410.

Persons skilled in the art can understand that the terminal 140 may further include a power supply (for example, a battery) supplying power to the components, and the power supply may be logically connected to the processor 1410 through a power management system. In this way, functions such as charge management, discharge management, and power consumption management are implemented by using the power management system. The structure of the terminal shown in FIG. 14 does not constitute any limitation on the terminal. The terminal may include more or fewer components than shown in the figure, or a combination of some components, or the components disposed differently. Details are not described herein again.

It can be understood that in this embodiment of this application, the input unit 144 may include a graphics processing unit (GPU) 1441 and a microphone 1442. The graphics processing unit 1441 processes image data of a still picture or video obtained by an image capture apparatus (such as a camera) in a video capture mode or an image capture mode. The display unit 146 may include a display panel 1461, and the display panel 1461 may be configured in a form of a liquid crystal display, an organic light-emitting diode, and the like. The user input unit 147 may include a touch panel 1471 and other input devices 1472. The touch panel 1471 is also referred to as a touchscreen. The touch panel 1471 may include two parts: a touch detection apparatus and a touch controller. The other input devices 1472 may include but are not limited to a physical keyboard, a function key (such as a volume control key or a power on/off key), a trackball, a mouse, a joystick, and the like. Details are not described herein.

In this embodiment of this application, the radio frequency unit 141 receives downlink data from a network-side device, and then sends the downlink data to the processor 1410 for processing; and also sends uplink data to the network-side device. Generally, the radio frequency unit 141 includes but is not limited to an antenna, at least one amplifier, a transceiver, a coupler, a low noise amplifier, a duplexer, and the like.

The memory 149 may be configured to store software programs or instructions and various data. The memory 149 may include a program or instruction storage area and a data storage area. The program or instruction storage area may store an operating system, an application program or instructions required by at least one function (for example, a sound playback function or an image playback function), and the like. In addition, the memory 149 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 1410 may include one or more processing units. Optionally, an application processor and a modem processor may be integrated in the processor 1410. The application processor primarily processes an operating system, user interfaces, application programs or instructions, and the like. The modem processor primarily processes radio communication, for example, being a baseband processor. It can be understood that the modem processor may alternatively be not integrated in the processor 1410.

The radio frequency unit 141 is configured to receive disaster condition information related to a first PLMN to which a terminal belongs.

The processor 1410 is configured to select an available PLMN for access in a case that the disaster condition information indicates a disaster condition having occurred on the first PLMN.

Optionally, the selecting an available PLMN for access includes one of the following:

randomly selecting one PLMN for access from all currently available PLMNs;

randomly selecting one PLMN for access from third PLMNs, where the third PLMN is a PLMN sending the disaster condition information and capable of providing services for users of the first PLMN in a case that a disaster condition occurs on the first PLMN;

selecting one available PLMN for access from a PLMN list in configured disaster condition network selection information, where a PLMN in the PLMN list is a PLMN that the terminal is allowed to access in a case that a disaster condition occurs on the first PLMN; and selecting one available PLMN for access from the PLMN list in the configured disaster condition network selection information, where the selected PLMN is the third PLMN.

Optionally, the selecting one available PLMN for access from a PLMN list in configured disaster condition network selection information includes one of the following:

selecting one available PLMN in descending order of priorities in a case that priority information is configured for the PLMNs in the disaster condition network selection information; and randomly selecting one available PLMN from the PLMNs in the disaster condition network selection information.

Optionally, the disaster condition network selection information further includes at least one of the following:

priority information of the PLMNs in the PLMN list; and access technologies of the PLMNs in the PLMN list.

Optionally, the processor 1410 is configured to obtain or update the disaster condition network selection information.

Optionally, the obtaining or updating the disaster condition network selection information includes:

receiving encrypted disaster condition network selection information sent by a first home PLMN.

Optionally, the obtaining or updating the disaster condition network selection information includes:

sending a registration request to a network-side device of a first home PLMN or a first visited PLMN; and receiving registration accept information sent by the network-side device, where the registration accept information carries the disaster condition network selection information.

Optionally, the obtaining or updating the disaster condition network selection information includes:

receiving downlink non-access stratum transport information sent by a network-side device of a first home PLMN or a first visited PLMN, where the downlink non-access stratum transport information carries the disaster condition network selection information.

Optionally, the obtaining or updating the disaster condition network selection information includes:

a. receiving a configuration update command sent by a network-side device of a first home PLMN or a first visited PLMN, where the configuration update command carries the disaster condition network selection information.

Optionally, the receiving disaster condition information related to a first PLMN to which the terminal belongs includes one of the following:

receiving the disaster condition information broadcast by a second PLMN; and receiving the disaster condition information sent by the first PLMN.

Optionally, the disaster condition information broadcast by the second PLMN includes at least one of the following:

a disaster condition having occurred on the first PLMN;

area information of a disaster condition having occurred on the first PLMN; and indication information for indicating whether the second PLMN is able to provide services for users of the first PLMN in a case that a disaster condition occurs on the first PLMN.

Optionally, the receiving the disaster condition information sent by the first PLMN includes at least one of the following:

receiving the disaster condition information provided by the first PLMN by using a broadcast message;

receiving the disaster condition information provided by the first PLMN by using a non-access stratum message;

receiving the disaster condition information provided by the first PLMN by using an RRC release message; and receiving the disaster condition information provided by the first PLMN by using a switching command.

Optionally, the disaster condition information sent by the first PLMN includes at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

Optionally, the selecting an available PLMN for access includes:

sending an access stratum message to the selected PLMN, so as to perform cell selection or reselection on the selected PLMN.

Optionally, the processor 1410 is further configured to: search for a PLMN based on a preset periodicity, and reselect to a higher-priority PLMN in a case that the higher-priority PLMN is found.

Optionally, the preset periodicity is configured in a SIM or USIM of the terminal, or determined during implementation by the terminal, or configured by an operator.

Alternatively, in some other embodiments, the processor 1410 is configured to: obtain or update disaster condition network selection information, where the disaster condition network selection information includes a PLMN list, and a PLMN in the PLMN list is a PLMN that the terminal is allowed to access in a case that a disaster condition occurs on a first PLMN to which the terminal belongs.

Optionally, the disaster condition network selection information further includes at least one of the following:

priority information of the PLMNs in the PLMN list; and access technologies of the PLMNs in the PLMN list.

Optionally, the obtaining or updating the disaster condition network selection information includes:

receiving encrypted disaster condition network selection information sent by a first home PLMN.

Optionally, the obtaining or updating the disaster condition network selection information includes:

sending a registration request to a network-side device of a first home PLMN or a first visited PLMN; and receiving registration accept information sent by the network-side device, where the registration accept information carries the disaster condition network selection information.

Optionally, the obtaining or updating the disaster condition network selection information includes:

receiving downlink non-access stratum transport information sent by a network-side device of a first home PLMN or a first visited PLMN, where the downlink non-access stratum transport information carries the disaster condition network selection information.

Optionally, the obtaining or updating the disaster condition network selection information includes:

receiving a configuration update command sent by a network-side device of a first home PLMN or a first visited PLMN, where the configuration update command carries the disaster condition network selection information.

Figure 15:
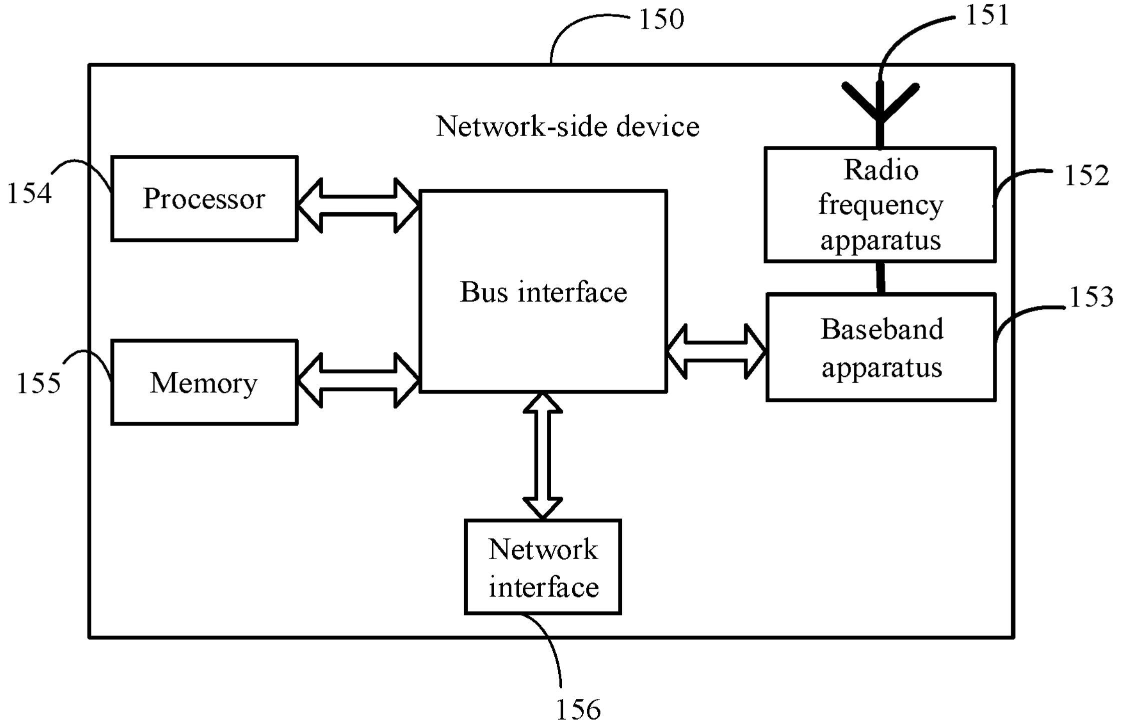
FIG. 15 is a schematic diagram of a hardware structure of a network-side device according to an embodiment of this application.

An embodiment of this application further provides a network-side device. As shown in FIG. 15, the network device 1500 includes an antenna 151, a radio frequency apparatus 152, and a baseband apparatus 153. The antenna 151 is connected to the radio frequency apparatus 152. In an uplink direction, the radio frequency apparatus 152 receives information by using the antenna 151, and sends the received information to the baseband apparatus 153 for processing. In a downlink direction, the baseband apparatus 153 processes to-be-sent information, and sends the information to the radio frequency apparatus 152; and the radio frequency apparatus 152 processes the received information and then sends the information out by using the antenna 151.

The frequency band processing apparatus may be located in the baseband apparatus 153. The method performed by the network-side device in the foregoing embodiments may be implemented in the baseband apparatus 153, and the baseband apparatus 153 includes a processor 154 and a memory 155.

The baseband apparatus 153 may include, for example, at least one baseband processing unit, where a plurality of chips are disposed on the baseband processing unit. As shown in FIG. 15, one of the chips is, for example, the processor 154, connected to the memory 155, to invoke a program in the memory 155 to perform the operation of the network device shown in the foregoing method embodiment.

The baseband apparatus 153 may further include a network interface 156, configured to exchange information with the radio frequency apparatus 152, where the interface is, for example, a common public radio interface (common public radio interface, CPRI). Specifically, the network-side device in this embodiment of the present invention further includes: instructions or a program stored in the memory 155 and capable of running on the processor 154. The processor 154 invokes the instructions or program in the memory 155 to execute the method executed by the modules shown in FIG. 10 or FIG. 12, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing network selection method embodiments can be implemented, the processes of the foregoing information obtaining method embodiments can be implemented, and the processes of the foregoing information sending method embodiments can be implemented, with same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing network selection method embodiments, the processes of the foregoing information obtaining method embodiments, and the processes of the foregoing information sending method embodiments, with the same technical effects achieved. To avoid repetition, details are not described herein again.

It should be understood that the chip mentioned in this embodiment of this application may also be referred to as a system-on-chip, a system chip, a system-on-a-chip, or a system on a chip, or the like.

An embodiment of this application further provides a program product, where the program product is stored in a non-volatile storage medium, and the program product is executed by at least one processor to implement the processes of the foregoing network selection method embodiments, the processes of the foregoing information obtaining method embodiments, and the processes of the foregoing information sending method embodiments, with same technical effects achieved. To avoid repetition, details are not described herein again.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. Furthermore, it should be noted that, in the scope of the method and apparatus in the embodiments of this application, execution of the functions is not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A network selection method, performed by a terminal and comprising:

receiving disaster condition information related to a first PLMN to which the terminal belongs; and selecting an available PLMN for access in a case that the disaster condition information indicates a disaster condition having occurred on the first PLMN;

wherein the method further comprises:

obtaining or updating disaster condition network selection information; wherein the disaster condition network selection information comprises a PLMN list, and a PLMN in the PLMN list is a PLMN that the terminal is allowed to access in a case that a disaster condition occurs on the first PLMN;

wherein the obtaining or updating the disaster condition network selection information comprises:

sending a registration request to a network-side device of the first PLMN; wherein the first PLMN is a home PLMN or a visited PLMN; and receiving registration accept information sent by the network-side device, wherein the registration accept information carries the disaster condition network selection information;

or, wherein the obtaining or updating the disaster condition network selection information comprises:

receiving a configuration update command sent by a network-side device of the first PLMN, wherein the first PLMN is a home PLMN or a visited PLMN; and the configuration update command carries the disaster condition network selection information.

2. The method according to claim 1, wherein the selecting an available PLMN for access comprises one of the following:

randomly selecting one PLMN for access from all currently available PLMNs;

randomly selecting one PLMN for access from third PLMNs, wherein the third PLMN is a PLMN sending the disaster condition information and capable of providing services for users of the first PLMN in a case that a disaster condition occurs on the first PLMN;

selecting one available PLMN for access from the PLMN list in configured disaster condition network selection information; and selecting one available PLMN for access from the PLMN list in the configured disaster condition network selection information, wherein the selected PLMN is the third PLMN.

3. The method according to claim 2, wherein the selecting one available PLMN for access from a PLMN list in configured disaster condition network selection information comprises one of the following:

selecting one available PLMN in descending order of priorities in a case that priority information is configured for the PLMNs in the disaster condition network selection information; and randomly selecting one available PLMN from the PLMNs in the disaster condition network selection information.

4. The method according to claim 1, wherein the disaster condition network selection information further comprises at least one of the following:

priority information of the PLMNs in the PLMN list; and access technologies of the PLMNs in the PLMN list.

5. The method according to claim 1, wherein the receiving disaster condition information related to a first PLMN to which the terminal belongs comprises one of the following:

receiving the disaster condition information broadcast by a second PLMN; and receiving the disaster condition information sent by the first PLMN.

6. The method according to claim 5, wherein the disaster condition information broadcast by the second PLMN comprises at least one of the following:

a disaster condition having occurred on the first PLMN;

area information of a disaster condition having occurred on the first PLMN; and indication information for indicating whether the second PLMN is able to provide services for users of the first PLMN in a case that a disaster condition occurs on the first PLMN.

7. The method according to claim 5, wherein the receiving the disaster condition information sent by the first PLMN comprises at least one of the following:

receiving the disaster condition information provided by the first PLMN by using a broadcast message;

receiving the disaster condition information provided by the first PLMN by using a non-access stratum message;

receiving the disaster condition information provided by the first PLMN by using an RRC release message; and receiving the disaster condition information provided by the first PLMN by using a switching command.

8. The method according to claim 5, wherein the disaster condition information sent by the first PLMN comprises at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

9. The method according to claim 1, wherein the selecting an available PLMN for access comprises:

sending an access stratum message to the selected PLMN, so as to perform cell selection or reselection on the selected PLMN; and/or, wherein after the selecting an available PLMN for access, the method further comprises:

searching for a PLMN based on a preset periodicity; and reselecting to a higher-priority PLMN in a case that the higher-priority PLMN is found;

wherein the preset periodicity is configured in a SIM or USIM of the terminal, or determined during implementation by the terminal, or configured by an operator.

10. A non-transitory readable storage medium, wherein a program or instructions are stored in the non-transitory readable storage medium; and when the program or the instructions are executed by a processor, the steps of the network selection method according to claim 1 are implemented.

11. A terminal, comprising a processor, a memory, and a program or instructions stored in the memory and capable of running on the processor, wherein the program or the instructions, when executed by the processor, cause the processor to implement:

receiving disaster condition information related to a first PLMN to which the terminal belongs; and selecting an available PLMN for access in a case that the disaster condition information indicates a disaster condition having occurred on the first-PLAN PLMN;

wherein the program or the instructions, when executed by the processor, further cause the processor to implement:

obtaining or updating disaster condition network selection information; wherein the disaster condition network selection information comprises a PLMN list, and a PLMN in the PLMN list is a PLMN that the terminal is allowed to access in a case that a disaster condition occurs on the first PLMN;

wherein the obtaining or updating the disaster condition network selection information comprises:

sending a registration request to a network-side device of the first PLMN; wherein the first PLMN is a home PLMN or a visited PLMN; and receiving registration accept information sent by the network-side device, wherein the registration accept information carries the disaster condition network selection information;

or, wherein the obtaining or updating the disaster condition network selection information comprises:

receiving a configuration update command sent by a network-side device of the first PLMN, wherein the first PLMN is a home PLMN or a visited PLMN; and the configuration update command carries the disaster condition network selection information.

12. The terminal according to claim 11, wherein the selecting an available PLMN for access comprises one of the following:

randomly selecting one PLMN for access from all currently available PLMNs;

randomly selecting one PLMN for access from third PLMNs, wherein the third PLMN is a PLMN sending the disaster condition information and capable of providing services for users of the first PLMN in a case that a disaster condition occurs on the first PLMN;

selecting one available PLMN for access from the PLMN list in configured disaster condition network selection information; and selecting one available PLMN for access from the PLMN list in the configured disaster condition network selection information, wherein the selected PLMN is the third PLMN.

13. The terminal according to claim 12, wherein the selecting one available PLMN for access from a PLMN list in configured disaster condition network selection information comprises one of the following:

selecting one available PLMN in descending order of priorities in a case that priority information is configured for the PLMNs in the disaster condition network selection information; and randomly selecting one available PLMN from the PLMNs in the disaster condition network selection information.

14. The terminal according to claim 11, wherein the receiving disaster condition information related to a first PLMN to which the terminal belongs comprises one of the following:

receiving the disaster condition information broadcast by a second PLMN; and receiving the disaster condition information sent by the first PLMN.

15. The terminal according to claim 12, wherein the disaster condition network selection information further comprises at least one of the following:

priority information of the PLMNs in the PLMN list; and access technologies of the PLMNs in the PLMN list.

16. The terminal according to claim 14, wherein the receiving the disaster condition information sent by the first PLMN comprises at least one of the following:

receiving the disaster condition information provided by the first PLMN by using a broadcast message;

receiving the disaster condition information provided by the first PLMN by using a non-access stratum message;

receiving the disaster condition information provided by the first PLMN by using an RRC release message; and receiving the disaster condition information provided by the first PLMN by using a switching command.

17. The terminal according to claim 14, wherein the disaster condition information sent by the first PLMN comprises at least one of the following:

a disaster condition having occurred on the first PLMN;

area information of a disaster condition having occurred on the first PLMN; and a frequency and/or cell of a PLMN that is accessible in a case that a disaster condition occurs on the first PLMN.

* * * * *